United States Patent Office 2,833,656
Patented May 6, 1958

2,833,656

METHOD AND MEANS FOR TREATING PERISHABLE AGRICULTURAL PRODUCTS

Arthur F. Kalmar and Hugh F. Fitzpatrick, Riverside, Calif., assignors to Food Machinery and Chemical Corporation, San Jose, Calif., a corporation of Delaware No Drawing. Application June 2, 1953
Serial No. 359,216

4 Claims. (Cl. 99—154)

This invention relates to the treatment of perishable agricultural products, and more particularly to methods and means for sterilizing and immunizing fruit and vegetables to protect them from the decaying effects of molds and bacteria.

An object of our invention is to provide an improved method of treating perishable agricultural products to protect them from decay.

Another object is to provide an improved treating agent for sterilizing fruit and vegetables as a protection therefor against decay.

The water soluble salts of hydroxy diphenyl, such as the salts of the alkaline metals, have proven highly effective as fungicides and bactericides in the treatment of fruit and vegetables to protect them from decay. The salt of this class which usually is preferred is sodium orthophenylphenate. Unfortunately, however, the hydroxy diphenyl salts have a tendency to hydrolyze into orthophenylphenol which is extremely phytotoxic and causes chemical burning of the fruit peel. It has, therefore, been proposed to add a chemical compound by the name of hexamethylenetetramine commonly known as hexamine, to the orthophenylphenate solution. Hexamine rapidly interacts with the phytotoxic hydrolysis product of orthophenylphenate to form compounds that have no harmful effect upon fruit or vegetables. Therefore, whenever the orthophenylphenate of the treating solution hydrolyzes into phytotoxic orthophenylphenol during or after treatment of fruit or vegetables with said solution, the hexamine present in the solution removes said orthophenylphenol immediately by converting it into non-toxic products.

However, the results obtained by treating fruit and vegetables with a mixture of orthophenylphenate and hexamine have not been satisfactory. While the "burning" of fruit and vegetable rinds could be prevented by the presence of hexamine in the solution, the treatment proved frequently ineffective to prevent decay of the fruit or vegetables treated therewith, especially in areas of fruit and vegetables at and around punctures and cuts in the rind thereof.

Another object is to provide a method of, and an agent for, treating perishable agricultural products which will sterilize not only the smooth, uninjured rind surfaces of the products being treated, but also will effectively immunize the tissues within, and adjacent, breaks in the rind surfaces without damaging the fruit itself.

Another object is so to fortify the treating agent that the sterilizing treatment and agent remain effective, particularly within, and adjacent, breaks in the rind surface, for a substantial period after the treating solution has been applied, without developing phytotoxic characteristics.

We have discovered that under certain conditions a solution of orthophenylphenate and hexamine may rapidly be converted into compounds that have no appreciable germicidal or fungicidal effect so that fruit treated therewith will either be left without protection, or will rapidly lose its protection, against molds and other decay organisms. The reason for the failure of the solution to properly sterilize and protect fruit and vegetables treated therewith is that the initial pH value of the treating mixture drops frequently due to the influence of the carbon dioxide contained in the air and due to the effect of fruit acids that are contained in and/or released through cuts and punctures in the fruit and vegetable rinds. As the pH value of the solution drops below a critical value in the neighborhood of 11, the orthophenylphenate begins to hydrolyze rapidly to orthophenylphenol, and while the presence of hexamine in the solution prevents said solution from developing phytotoxic characteristics by rapid conversion of the orthophenylphenol into harmless end products, the end products have no appreciable germicidal or fungicidal effect. Hence, depending upon the extent to which the treating solution comes into contact with air and/or with fruit acids, its initial effectiveness as a sterilizer and protector of fruit and vegetables is rapidly destroyed. This is particularly true for those portions of the solution that soak into cuts or punctures of fruit and vegetable rinds where they come into contact with fruit acids.

In accordance with the invention we therefore incorporate into a treating solution of an orthophenylphenate and hexamine an alkali and/or alkali buffer in sufficient quantity to maintain the solution at a pH value which will prevent hydrolysis of the orthophenylphenate. With the solution held at such a pH value, no appreciable hydrolysis of the orthophenylphenate can occur, and the hexamine present in the solution will merely act as a safeguard to remove immediately what small amounts of phytotoxic orthophenylphenol may develop in the solution upon exposure to air and/or contact with fruit acids, without being able to convert a major portion of the orthophenylphenate into ineffective end products of orthophenylphenol and hexamine.

Thus, for instance, a combination of sodium orthophenylphenate, hexamine and an alkali in quantities capable of depressing hydrolysis of the orthophenylphenate in the tank permits fruit and vegetables to be treated commercially in a safe and lastingly effective manner. The high pH of the treating solution as established by the alkali and/or alkali buffer additive preserves the effectiveness of the sodium orthophenylphenate in the tank permitting it to exert its full fungicidal action on molds and other spoilage organisms during the time the fruit is exposed to the solution. During this phase of the treatment, the hexamine contained in the solution remains without effect and will not detract from the fungicidal effectiveness thereof since it does not react with the sodium orthophenylphenate and since the orthophenylphenate is stabilized by the presence of the alkali and/or the alkali buffer. After the fruit has been removed from the treating solution, however, and has been drained and rinsed with water, the hexamine will come into play and remove any orthophenylphenol that may be formed by hydrolysis of the orthophenylphenate in residual portions of the solution that remain in the cuts and punctures of fruit rinds.

Extensive experimentation has demonstrated that for a fungicidal solution of sodium orthophenylphenate to be effective, it should contain at least .02% of sodium orthophenylphenate. To prevent hydrolysis of the orthophenylphenate in the solution while within the tank, the pH value of the solution should be maintained in the neighborhood of 11 by the addition of an alkali and/or an alkali buffer. In the individual case, the exact limit below which the pH value must not be allowed to drop depends upon the concentration of the orthophenylphenate in the solution and also upon the temperature of the solution. To prevent injury to fruit or vegetables from orthophenylphenol, the hexamine should be present in sufficient quantity to remove the orthophenylphenol that may be formed in cuts and punctures of fruit and vegetable rinds at a faster rate than the rate at which it may be absorbed by the fruit tissue. Thus, in a concentration of .05% sodium orthophenylphenate, or even a concentration as low as .02%, the hexamine should be present in the initial solution at a concentration of at least .5%. When using 1% or more of sodium orthophenylphenate, the hexamine concentration of the solution should be .5% plus a percentage of hexamine that is related to the percentage of the sodium orthophenylphenate in the solution at the ratio of the molecular combining weights of the two compounds as expressed by the formula:

Percent hexamine required =
$$\frac{\text{Percent sodium orthophenylphenate}}{4} + 0.5\%$$

For instance, in a solution containing 1% of sodium orthophenylphenate, the percentage of hexamine additive required is $$\frac{1\%}{4} + 0.5\% = .75\% \text{ hexamine}$$

or in a solution containing 2% of sodium orthophenylphenate, the amount of hexamine required is about $$\frac{2\%}{4} + 0.5\% = 1\% \text{ hexamine}$$

As pointed out hereinbefore, it is most important in accordance with the present invention that the pH value of the mixture of orthophenylphenate and hexamine be sufficiently high to prevent hydrolysis of the orthophenylphenate in the tank, for a decrease of the pH value below said limit would quickly render the solution ineffective and allow fruit or vegetables treated therewith to decay at a rapid rate. In the practical performance of the process of the invention, an insufficiency of the pH value of the described treating solution evidences itself by an excessive amount of crystallization that results from the interaction of orthophenylphenol and hexamine and is indicative of the conversion of the effective orthophenylphenate into ineffective compounds. The crystals form in the treating tank and on the conveying equipment over which the wet fruit passes, and adhere to the fruit detracting greatly from the fresh appearance thereof. They are a distinct sign that the pH value of the solution in the tank must be increased to maintain the sterilizing effectiveness thereof. The criticality of maintaining the solution above a minimum pH value is demonstrated by the fact that in a solution containing .5% of sodium orthophenylphenate and .5% of hexamine, a pH value of 11.27 was effective to prevent hydrolysis of the sodium orthophenylphenate, but undesirable crystal formation indicative of such hydrolysis and of resultant deterioration in the germicidal effectiveness of the solution commenced as soon as the pH value of the solution had dropped to 11.16. Similarly, in a solution containing 3% sodium orthophenylphenate and 1.25% hexamine, a pH value of 12.03 was effective to prevent hydrolysis of the sodium orthophenylphenate, but crystal formation commenced as soon as the pH value of the solution had dropped to 11.9.

The method of cleaning citrus fruit as well as many other fruits and vegetables in accordance with the invention is to wash them in a solution of a detergent and a fungicide at temperatures within the range of from about 70° to about 120° F. and for various periods of time, depending upon the tenacity with which the dirt, scale, insects and smudge oil deposits adhere to the fruit surface. Thereafter, the fruit is passed over rotating brushes while the cleaning and disinfecting solution is flooded over the fruit. In some operations the fruit is washed in a detergent solution first and then contacted with the sterilizing solution by means of dipping, flooding or spraying. Thereafter, the general practice is to rinse the fruit with fresh water to remove from its surface the detergent and the fungicide which, if left on, would detract from the clean appearance of the fruit.

When washing and sterilizing citrus fruit in the above described manner, there is a continuous absorption of carbon dioxide from the air by the treating solution since the treating tanks are open, and the solution is constantly recirculated and flooded over the fruit as they pass over rapidly revolving brushes. Moreover, commercially handled citrus fruit contains many crushed, bruised and cut specimens which enter the treating solution and release their juices thereinto. As pointed out hereinbefore, the reaction of carbon dioxide and fruit acid with the alkali in the solution may lower the pH value thereof to the point where orthophenylphenate is converted to orthophenylphenol which reacts with hexamine to produce compounds that have no appreciable fungicidal or germicidal effect and which exhibit the above-mentioned objectionable crystal formation. To prevent these undesirable phenomena, an alkaline buffer salt such as tetra sodium pyrophosphate, trisodium phosphate, sodium silicate, or sodium carbonate should be added to the solution in the treating tank at a concentration of at least 1% in sufficient quantity and at sufficiently frequent intervals to maintain an excess of the buffer in the solution so as to keep the pH at or above a safe minimum value.

Hydrolysis in the solution may also be controlled by the use of a free alkali, such as sodium or potassium hydroxide, in an amount sufficient to maintain the pH above the stated minimum. For this purpose the solution should contain at least .01% of free alkali. When using a free alkali to control the pH, it must be carefully metered into the solution during performance of the sterilizing process in order to prevent damage to the fruit by excessive amounts of free alkali. By employing an industrial type pH meter to control a feed valve that delivers a solution of the caustic material into the tank, said solution can be regulated automatically. However, by the use of a buffer salt in combination with a free alkali, it has been possible to control the pH value of the solution manually without the danger of burning the fruit by an excess of alkali or of permitting the formation of a relatively non-fungicidal precipitate.

An exemplary formula for a solution which we have found suitable for cleansing and sterilizing fruit is as follows:

*Initial charge for treating tank*

| | Percent by wt. |
|---|---|
| Sodium hydroxide (caustic flakes) | 0.086 |
| Trisodium phosphate | 1.0 |
| Soap (88% anhydrous) | 0.10 |
| Synthetic detergent | 0.10 |
| Hexamine | 1.0 |
| Sodium orthophenylphenate | 0.5 |
| Water | 97.214 |
| | 100.0 |

The daily charge requirement for each treating tank depends upon the volume of fruit that is being handled. There is practically no loss of the active fungicide due to chemical deterioration, and the amount of solution carried away by the fruit will determine the daily replacement that is necessary to maintain the tank at its full operating level.

An exemplary formula which we have found suitable for replenishing the solution in the tank is as follows:

Composition of daily charge feed solution

| | Percent by wt. |
|---|---|
| Sodium hydroxide | 1.0 |
| Trisodium phosphate | 1.0 |
| Soap (88% anhydrous) | 0.05 |
| Synthetic detergent | 0.20 |
| Hexamine | 1.0 |
| Sodium orthophenylphenate | 0.5 |
| Water | 96.25 |
| | 100.0 |

In performing the process of our invention the following sequence of operations has been found advantageous: Unwashed fruit from the field is dumped into the treating solution which is contained in a long open tank. The fruit is progressed through the tank by a series of rotary submergers. The tank is of such length and the submergers are operated at such speed that the fruit remains in the solution from two to four minutes. The fruit is then delivered over a series of transverse rotary cleaning brushes under a flood of the same treating solution. Thereafter the fruit passes through a fresh water spray which removes the treating solution on the water repellent rind surfaces of the fruit. Whatever portion of the treating solution has penetrated into rind injuries, remains effective to immunize them against reinoculation. After the fresh water rinse the fruit may be delivered to a conveyor leading to a drier or a sorting table.

It is not essential that fruit treated with the solution of this invention be rinsed after treatment, and instead the fruit may be permitted to dry without rinsing. The necessary contact between the treating solution and the fruit varies from a few seconds to about 30 minutes and may be accomplished by dipping of the fruit into the solution, spraying the solution onto the fruit, flooding it over the fruit or allowing the fruit to soak submerged in the solution. The type of fruit being treated and the concentration of sodium orthophenylphenate in the treating solution will determine the optimum time. In treating oranges for the control of blue and green mold, a concentration of 0.5% sodium orthophenylphenate is generally used and the fruit is generally exposed to such a solution for about 5 minutes. For the control of stem-end rot of citrus fruit, a concentration of from 2 to 3% of sodium orthophenylphenate may be employed to which the fruit is exposed for about 2 minutes. For the treatment of molds affecting cantaloupes, a solution containing 1% of sodium orthophenylphenate may be applied to the fruit in the form of a flood or spray, or the fruit may be dipped into the solution and is then left to dry without a water rinse.

In the hydro-cooling of oranges, the fruit may be flooded by cold water containing the composition of this invention at a temperature near or below the freezing point. In such instances, the treating time may have to be as long as 30 minutes.

As previously pointed out, and as is apparent from the above given exemplary formulae, the treating solution of the invention may contain an additive of soap and/or synthetic detergent. Such an additive facilitates the cleaning of the fruit surface and lowers the surface tension of the solution so that the fungicide will thoroughly wet all mold spores on the surface of the fruit and will also be brought into intimate contact with the mold spores in the cuts, punctures and other wounds in the surface of the fruit. The presence of soap and certain synthetic detergents in the fungicidal solution is also effective to prevent crystal formations resulting from the interaction of orthophenylphenol and hexamine from adhering to tank surfaces, paddle submergers, roller elevators, etc., which are exposed to the air during the nightly shut-down period. As soon as these surfaces are re-wetted by a fungicidal solution containing soap and/or other detergents, the crystals dissolve in the solution.

The fungicidal composition of this invention has been used very successfully for the chemical sterilization of all types of citrus fruits, tomatoes, melons, squash, bananas, and other fruits and vegetables.

Since hexamine is produced by the reaction of ammonia and formaldehyde $$(4NH_3 + 6HCHO = C_6H_{12}N_4 + 6H_2O)$$

it will be understood that the simultaneous use of compounds which supply ammonia and formaldehyde within the treating tank falls within the scope of this invention, and wherever the claims call for hexamine, the term should be understood to include the use of compounds in, or the delivery of compounds to, the treating tank that will form hexamine therein.

While we have explained our invention with the aid of exemplary embodiments thereof, it will be understood that we do not wish to be limited to the specific compounds and/or quantities and percentages stated, which may be departed from without departing from the spirit and scope of the invention.

Having thus described our invention what we claim as new and desire to protect by Letters Patent is:

1. A method of treating perishable agricultural products which comprises, contacting said products with an aqueous solution containing at least 0.02% by weight of a water soluble salt of orthophenylphenol, at least 0.5% by weight of hexamethylenetetramine, and also containing an alkaline substance in sufficient concentration to maintain the pH of said solution above a value of 11 to depress hydrolysis of said salt.

2. A method of treating perishable agricultural products for protecting said products against decay which comprises, contacting the products with an aqueous solution containing at least .02% by weight of sodium orthophenylphenate, at least .5% by weight of hexamethylenetetramine, at least .1% by weight of an alkaline buffer salt to maintain the pH of said solution in the neighborhood of 11 to prevent hydrolysis of the sodium orthophenylphenate.

3. A medium for treating agricultural products for protecting the same against decay, comprising an aqueous solution containing at least 0.02% by weight of sodium orthophenylphenate, at least .5% by weight of hexamethylenetetramine, and an alkalizing agent in sufficient concentration to maintain the pH of said solution in the neighborhood of about 11.

4. A medium for treating agricultural products for the purpose of inhibiting decay thereof, comprising a water solution containing at least 0.02% by weight of a water soluble salt of orthophenylphenate, at least 0.5% by weight of hexamethylenetetramine and a free alkali buffer in sufficient concentration to maintain the pH of said solution in the neighborhood of 11.

References Cited in the file of this patent

UNITED STATES PATENTS

| 1,935,599 | Rippey | Nov. 14, 1933 |
| 2,019,121 | Rewal | Oct. 29, 1935 |
| 2,129,936 | Johnson | Sept. 13, 1938 |
| 2,674,537 | Hopkins et al. | Apr. 6, 1954 |